US011334850B2

(12) United States Patent
Noel, Sr.

(10) Patent No.: US 11,334,850 B2
(45) Date of Patent: May 17, 2022

(54) ECONOMIC DEVELOPMENT AND COLLABORATION SYSTEM

(71) Applicant: John C. Noel, Sr., St. Johns, FL (US)

(72) Inventor: John C. Noel, Sr., St. Johns, FL (US)

(*) Notice: Subject to any disclaimer, the term of this patent is extended or adjusted under 35 U.S.C. 154(b) by 0 days.

(21) Appl. No.: 17/188,629

(22) Filed: Mar. 1, 2021

(65) Prior Publication Data

US 2021/0182795 A1 Jun. 17, 2021

Related U.S. Application Data

(63) Continuation-in-part of application No. 16/168,836, filed on Mar. 4, 2019.

(51) Int. Cl.

| | |
|---|---|
| ***G06F 13/00*** | (2006.01) |
| ***G06Q 10/10*** | (2012.01) |
| ***G06T 19/00*** | (2011.01) |
| ***G06Q 30/02*** | (2012.01) |
| ***G06F 16/29*** | (2019.01) |
| ***G06Q 50/16*** | (2012.01) |
| *G07C 13/00* | (2006.01) |

(52) U.S. Cl.

CPC ........... *G06Q 10/103* (2013.01); *G06F 16/29* (2019.01); *G06Q 30/0205* (2013.01); *G06Q 30/0279* (2013.01); *G06Q 50/163* (2013.01); *G06T 19/006* (2013.01); *G06Q 50/165* (2013.01); *G07C 13/00* (2013.01)

(58) Field of Classification Search

CPC ... G06F 16/29; G06F 16/9537; G06T 19/006; G07C 13/00; G06Q 10/103; G06Q 10/101; G06Q 50/163; G06Q 50/165; G06Q 50/16; G06Q 30/0205; G06Q 30/2079; G06Q 30/0203; G06Q 30/0201; G06Q 10/06315

USPC ........ 709/204–207, 217–219, 203, 201, 224; 715/751–759; 705/7.33, 7.37, 1.1

See application file for complete search history.

(56) References Cited

U.S. PATENT DOCUMENTS

| | | | | |
|---|---|---|---|---|
| 9,461,876 | B2 * | 10/2016 | Van Dusen | G06N 5/04 |
| 11,080,336 | B2 * | 8/2021 | Van Dusen | G06Q 50/01 |
| 2011/0054949 | A1 * | 3/2011 | Joye | G06Q 40/02 705/4 |
| 2014/0075004 | A1 * | 3/2014 | Van Dusen | H04L 41/04 709/223 |
| 2017/0235848 | A1 * | 8/2017 | Van Dusen | G06F 30/20 705/12 |

* cited by examiner

*Primary Examiner* — Kenneth R Coulter

(74) *Attorney, Agent, or Firm* — Marks Gray, P.A.; Mitchell Ghaneie; Christopher Roberts

(57) ABSTRACT

An exemplary embodiment of the present invention provides an economic development system, which enables individuals within a community to efficiently identify and express their interests in one or more economic propositions. The economic development system comprises an application which allows users to uniquely interface with the one or more economic propositions. Users of the economic development system are able to efficiently identify and express support or disapprove for one or more economic propositions. A plurality of engagement mechanisms is provided by the economic development system to assist users in democratizing their interests. The economic development system also allows for crowdfunding of economic propositions and further provides valuable statistical data which can be utilized by developers, business owners, and local municipalities to implement one or more economic propositions.

20 Claims, 8 Drawing Sheets

50

70

80

BizWish LLC.  Home / Business Wish / Business Wish Locator / User Profile / About / Coming Soon / Log Out

BizWish User Profile

Create your user profile

| First name | Last name |

Email address

Phone number

Birth Date | Month | Day | Year

Age Group Range: Under 18  18-25  26-30  31-40  41-50  51 or older

User name | Password

Male ● Female ○

Desired correspondence

Would you like to receive a BizWish site update alerts?  Yes ● No ○

Would you like to receive BizWish entry comment alerts?  Yes ● No ○

Would you like to receive announcement alerts?  Yes ● No ○

Would you like to receive business response alerts?  ●

How would you like to receive alerts?  email ○  text ○  both ●

Submit

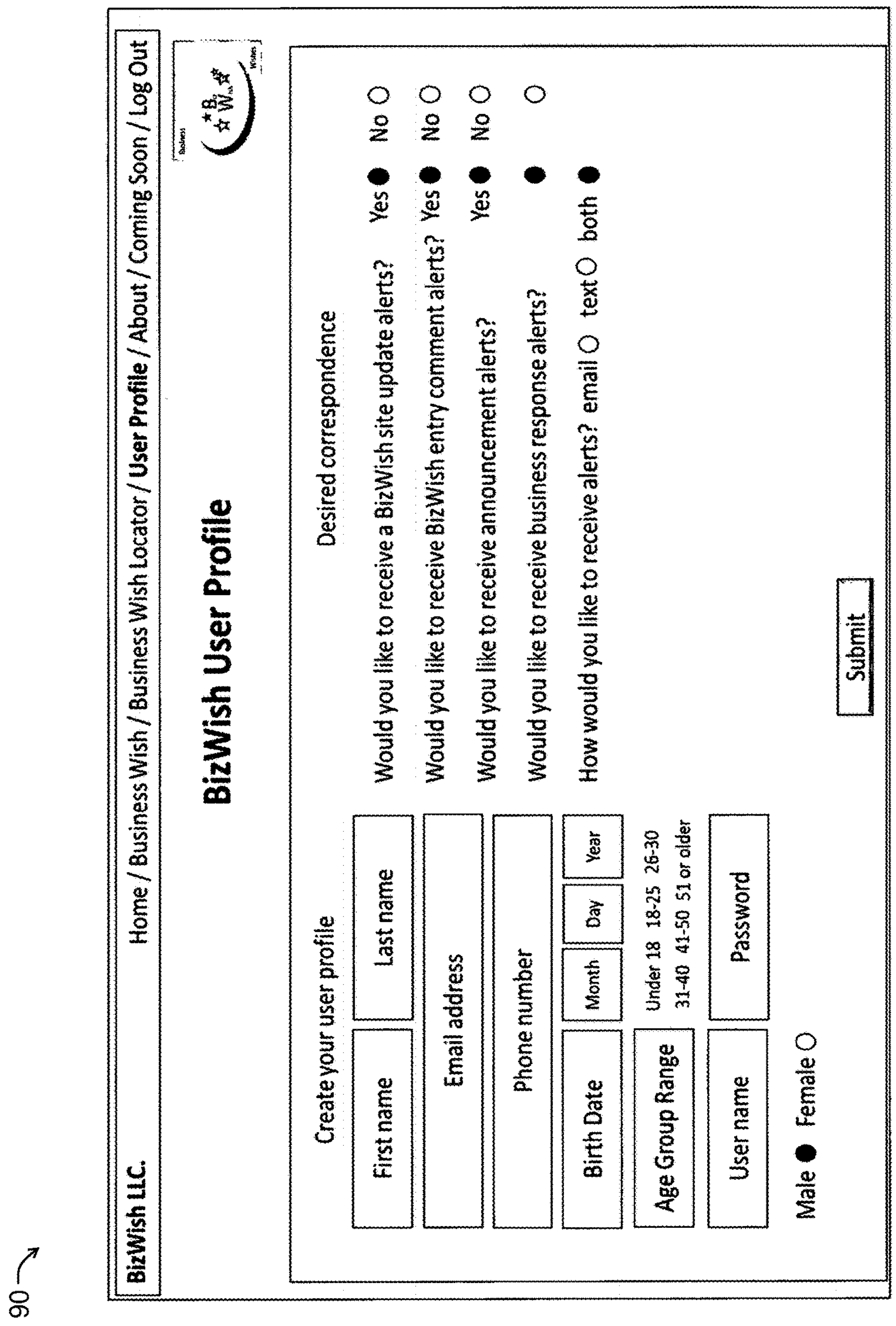

FIGURE 8

ECONOMIC DEVELOPMENT AND COLLABORATION SYSTEM

CROSS-REFERENCE TO RELATED APPLICATIONS

This application is a continuation-in-part of application Ser. No. 16/168,836 (now U.S. Pub. 2019-0228424), entitled "Business wish creation and collaboration website," filed Mar. 4, 2019, which is hereby incorporated by reference in their entirety for all purposes.

FIELD OF THE INVENTION

This invention relates generally to an economic development system for evaluating and effectuating community interest.

BACKGROUND

A large number of people in society have a desire to build, have built, or improve businesses in various areas. To facilitate the collective desires of a community, large amounts of data need to be collected, and then, communicated to entities that can either create or improve existing businesses in an effort to meet the needs of the people.

Online activity of users collaborating with one another generates valuable information concerning the users, their needs, and their interests. The aggregation and analysis of such information can provide business professionals and government officials with useful insight regarding new development or changes to existing businesses. However, such information is not readily accessible nor efficiently aggregated and organized to disseminate to those with the power and resources to effectuate such communal interests.

What is needed is a system which allows for individuals within a community to efficiently and effectively identify their interests in the development of new businesses, modification(s) to existing businesses, or improvement to existing infrastructure so that such information can be readily accessed and utilized.

SUMMARY OF THE INVENTION

An exemplary embodiment of the present invention provides an economic development system. The Economic Development and Collaboration System, hereinafter referred to as the "EDC System," enables individuals within a community to efficiently identify and express their interests in one or more economic propositions. The EDC System comprises an application, one or more mobile devices and at least one database, which stores information, including, but not limited to, information pertaining to the one or more economic propositions.

The one or more economic propositions may comprise the development of new businesses, modification(s) to existing businesses, or improvement to existing infrastructure. The one or more economic propositions are characterized by a plurality of attributes. The plurality of attributes may comprise a location, one or more photographs or videos of the existing location, one or more visual renderings of the economic proposition, a written description of the existing condition of the geographic location , and a written description of the economic proposition. It is anticipated that the plurality of attributes may also include a crowdfunding escrow account for receiving monetary contributions earmarked for the economic proposition. It is further anticipated that the plurality of attributes may also include existing and projected valuations of the real estate and/or property where the economic proposition is proposed to be located.

The EDC System allows its users to view one or more economic propositions and express their support or disapproval of the one or more economic propositions. Such expression of support or disapproval by a user may be manifested using a plurality of engagement mechanisms provided by the EDC System. The plurality of engagement mechanisms comprise quantitative and qualitative mechanisms. Additionally, the EDC System enables for the creation of one or more new alternative economic propositions at the same location of an existing economic proposition.

BRIEF DESCRIPTION OF THE DRAWINGS

FIG. 8 is an exemplary embodiment of a user account page of the web application for the economic development and collaboration system depicting exemplary information collected from the user.

NUMBER REFERENCES

Figure 1:
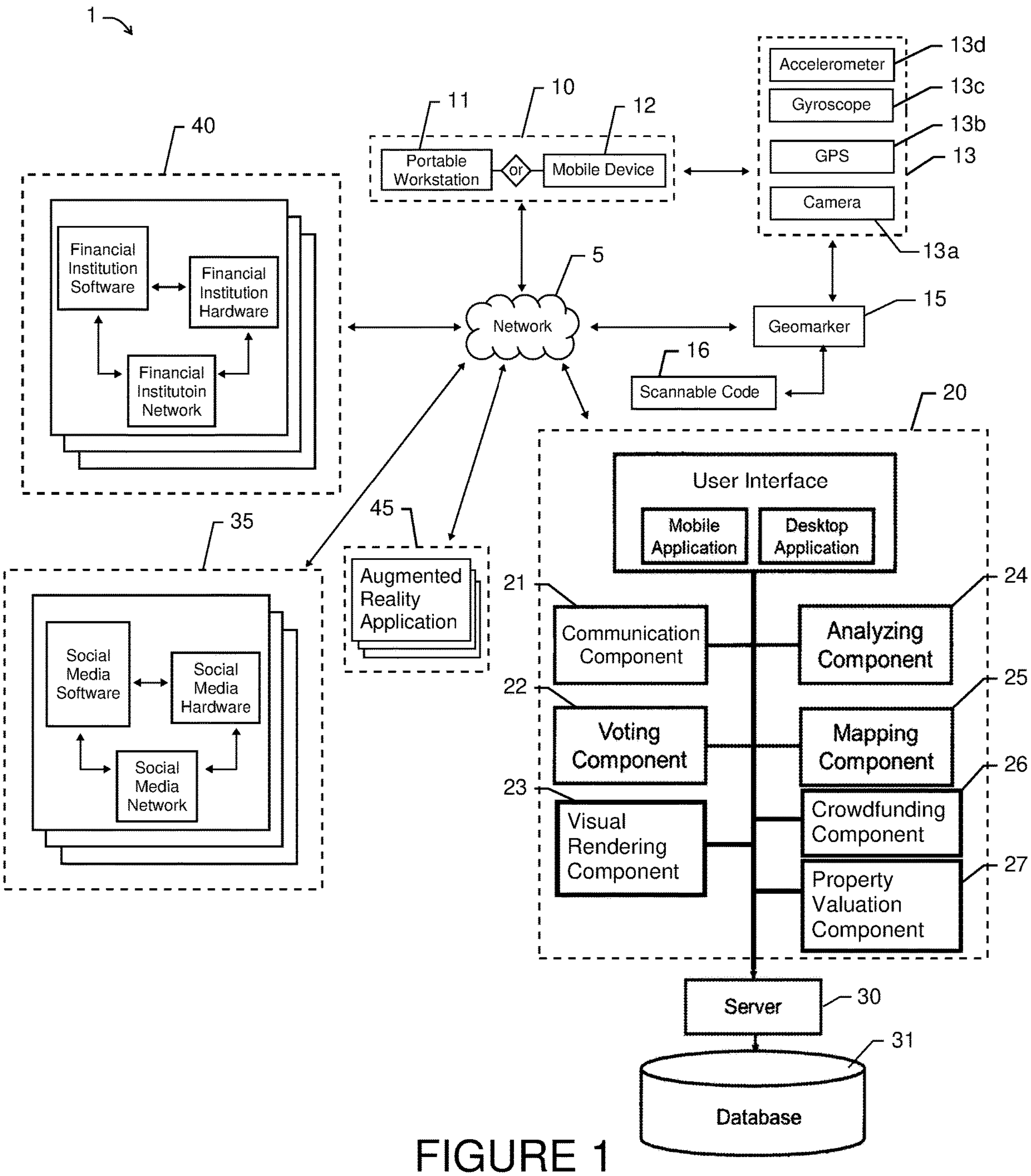
FIG. 1 depicts a schematic diagram that shows an exemplary embodiment of the economic development and collaboration system.

1—Economic development and collaboration system
5—Network
10—Personal computing device
11—Portable workstation
12—Mobile device
13—Plurality of sensors
13*a*—Camera
13*b*—GPS
13*c*—Gyroscope
13*d*—Accelerometer
15—Geomarker 20—Software application
21—Communication component
22—Voting component
23—Visual Rending Component
24—Analyzing Component
25—Mapping component
26—Crowdfunding component
27—Property valuation component
30—Server
31—Database
35—Social media platform
40—Financial institution
45—Augmented Reality Application
50—Public-facing homepage
60—User homepage
70—Economic proposition detail page
80—Economic proposition locator page
90—User account page

DETAILED DESCRIPTION

A non-limiting embodiment of an Economic Development and Collaboration System 1 uniquely enables individuals within a community to efficiently identify and express their interests in one or more economic propositions. The Economic Development and Collaboration System 1, hereinafter referred to as the "EDC System" 1, comprises a network 5, one or more personal computing devices 10, a software application 20, and at least one database 31. The network 5 has a plurality of end nodes which are wirelessly connected to it. The one or more personal computing devices 10 may comprise a portable workstation 11 or a mobile device 12. The one or more personal computing devices 10 must be capable of connecting to a network 5. It is further required that the one or more personal computing devices 10 either provide one or more sensors 13 or be capable of connecting to one or more sensors 13. The one or more sensors 13 may include a camera 13*a*, a global position system ("GPS") 13*b*, a gyroscope, 13*c*, or an accelerometer 13*d*. The software application 20 provides at least one user account for each user. The software application 20 is connected to the network 5 and synced with the database 31. The software application 20 comprises a communication component 21, a voting component 22, a visual rendering component 23, an analyzing component 24, a mapping component 25, a crowdfunding component 26, and a property valuation component 27. The software application 20 further comprises the capability of directly controlling the one or more sensors or syncing with one or more software applications that control the one or more sensors 13.

The EDC System 1 further comprises one or more servers 30, which store the database 31. The database 31 stores a plurality of information, which includes the one or more economic propositions. The database 31 must be accessible remotely through the network 5. The database 31 is updated by the software application 20 in real-time. Such real-time updates provided by the software application 20 are prompted directly or indirectly by one or more users.

The software application 20 is downloadable on a personal computing device 10. The software application 20 may also be a web-based application accessible through an internet browser connected to the network 5. The software application 20 provides a user interface for users to access and engage with information stored in the database 31. A user of the EDC System 1 may only fully access and engage with the software application 20 after creating a user account. The software application 20 requires the user to disclose predetermined personal data when creating a user account. If a user elects to not create a user account, the software application 20 will restrict the user's access to a portion of the information stored within the database 31. The user's personal user data collected during the creation of a user account allows for additional user metadata to be aggregated by the EDC System 1. Such additional user metadata, in combination with the personal user data provided by the users, is utilized by the analyzing component 24 for targeting third-party advertisements within the software application 20 as well as by the property valuation component 27 for generating property valuations of locations influenced by the one or more economic propositions.

The one or more economic propositions may comprise the development of new businesses, modification(s) to existing businesses and/or buildings, or improvements to existing infrastructure. Improvements to existing infrastructure may comprise an improvement to a public or private utility, drinking water system, wastewater system, traffic system, transit system, airport, roadway, sidewalk, bridge, park, land use, or the like. The one or more economic propositions are characterized by a plurality of attributes. The plurality of attributes may comprise a location, one or more photographs or videos of the existing location, one or more visual renderings of the economic proposition, a written description of the existing condition of the geographic location, and a written description of the economic proposition . It is anticipated that the plurality of attributes may also include a crowdfunding escrow account provided by the crowdfunding component. The crowdfunding component 26 determines whether a crowdfunding escrow account is enabled for a particular economic proposition based on a predetermined criterion. The crowdfunding escrow account is used by the crowdfunding component 26 to allow one or more economic propositions to receive one or more monetary contributions from one or more users. It is further anticipated that the plurality of attributes may also include existing and projected valuations of the real estate and/or property where the economic proposition is proposed to be located. Such existing and projected valuations are provided by the property valuation component 27. The analyzing component 24 aggregates data accumulated from the one or more economic propositions in combination with data generated directly and indirectly from its users to provide a plurality of first order and second order statistics describing the economic propositions. First order statistics comprises analytics of data generated directly from one or more users. Second order statistics comprises analytics of data generated directly and indirectly from one or more users.

The software application 20 allows its users to view and/or create one or more economic propositions as well as express their support or disapproval of the one or more economic propositions. Such expression of support or disapproval by a user may be manifested using a plurality of engagement mechanisms provided by the software application's communication component 21, voting component 22, and crowdfunding component 26. However, before a user creates an economic proposition or is able to express their support or disapprove of an economic proposition, the user must first select at least one user type from a predetermined plurality of user types, which describe the user's relationship to a particular economic proposition. The predetermined plurality of user types may comprise an individual consumer/patron, a business owner, a developer, or a public official. It is anticipated that when a user identifies as anything other than a consumer/patron, the software application 20 may require the user to submit additional credentials to verify their respective user type selection.

The software application 20 provides an economic proposition detail page 70 for each economic proposition. The economic proposition detail page 70 provides information input by the user who created the economic proposition, additional information provided by other users, and statistical data provided by the analyzing component 24. If more than one economic proposition exists at a specific location, the analyzing component 24 will automatically generate a notification on the economic proposition detail pages 70 of each of the economic propositions that share the same geographic locations that informs the user that there are competing economic propositions at the same geographic location.

The voting component 22 enables each user to cast a single vote for each economic proposition in support of or disapproval of the economic proposition. The voting component 22 provides a binary approval polling and a non-binary weighted approval polling. The voting component 22 performs the binary by tallying the cumulative totals of user votes for and against an economic proposition. The cumulative total votes for and against an economic proposition are displayed in real-time on the economic proposition's respective economic proposition detail page 70. The voting component 22, when performing the non-binary weighted approval polling, considers a plurality of factors in determining the weighted cumulative total votes. The plurality of factors comprises the proximity of a user's home or business address to the location of the economic proposition, the proximity of a user's physical location, when they vote, relative to the location of the economic proposition, the frequency of which the user is physically within a predetermined distance to the location of the economic proposition, and the level of engagement of the user within the software application 20.

As a non-limiting example, a user who lives nearby the location of the economic proposition, cast their vote for the economic proposition while on-site or substantially nearby the geographic location , frequently drives by the geographic location of the economic proposition relative to others who have voted, and has left numerous comments and shared the economic proposition detail page 70 with others will be weighted more heavily by the software application 20 when casting a vote of support or disapproval in comparison to another user who does not reside in a nearby community and has never been to the geographic location of the economic proposition.

The communication component 21 enables users to leave comments on each of the one or more economic proposition detail pages 70, which allows for the formation of one or more comment threads. Such comments may include a variety of public forms of expression, such as written comments, videos, pictures, gifs, emojis, etc. The comment threads are analyzed by the analyzing component 24 to gain deeper insights regarding the collective interest in an economic proposition. Comment threads provided by the communication component 21 are filterable. The communication component 21 enables users to also track and be notified about other users' activities within the EDI System 1.

The mapping component 25 interfaces with one or more third-party geospatial mapping applications as well as the GPS **13*b* provided by each user's personal computing device 10. using its mapping component 25. When a user wishes to create a new economic proposition, the software application 20 requests the user specify the location of the economic proposition by either inputting its geocoordinates or mailing address, should a mailing address exist, or selecting the economic proposition's location on an interactive map provided by the mapping component 25. After the location of an economic proposition has been input, the mapping component 25 provides a geolocation icon on the interactive map which visually identifies the location of the economic proposition. Similarly, a user may perform a text-based search for an economic proposition using a set of geocoordinates or a mailing address. Additionally, the mapping component 25 also allows users to create of one or more alternative economic propositions at the same location of an existing economic proposition. Furthermore, it is anticipated that the mapping component 25 will automatically provide a proximity alert notification to a user when the user is within a predetermined distance of an economic proposition. The mapping component 25 connects to and interfaces with the GPS 13*b* of each user's personal computing device 10. The proximity alert notification, which will be transmitted to the user's personal device 10**, will inform the user that the user is physically nearby one or more economic propositions.

It is also anticipated that EDC System 1 will further comprise one or more geomarkers 15. Each of the one or more geomarkers 15 provides an identification code 16 which is generated by the mapping component 26. The identification code 16 may comprise a scannable code such as a barcode, QR code, or RFID. Alternatively, the geomarker 15 may further comprise a wireless signal transmitter that transmits the identification code 16 using a wireless signal, such as near field communication transmission or Bluetooth technology. The identification code 16 links to one or more economic detail pages 70 when it is scanned by a camera **13*a* provided by a user's personal computing device 10 or when a user's personal computing device 10 receives the wireless signal transmitted by the geomarker's wireless transmitter. Economic propositions located at the same geographic location have the same identification code 16. The one or more geomarkers 15 are physically installed at the geographic location of the one or more economic propositions. If a geomarker 15 has not been installed at the geographic location of its respective economic proposition, the software application 20 allows the user to request a geomarker 15 be installed at the geographic location of the economic proposition by an authorized user. Each economic proposition has at least one authorized user. Installation of the geomarker 15 may take many forms, including by providing a sign, monument, or other physical body capable of providing an identification code 16. It is further anticipated that the one or more geomarkers 15 may also serve as augmented reality markers that support a user's personal computing device 10** or other third-party visualization hardware in displaying an augmented reality rendering of the economic proposition.

The visual rending component 23 allows for one or more visual renderings of the economic proposition. The one or more visual renderings may comprise photograph(s), video(s), or computer-aided design(s). The software application 20 further allows for one or more visual renderings to be immersive augmented reality renderings. The visual rendering component 23 is capable of integrating with one or more third-party augmented reality applications 45 that allow the user to view augmented reality renderings with the personal computing device 10 or third-party hardware while the user is within a predetermined distance from the geographic location of the economic proposition. Such integration of third-party augmented reality applications 45 will require the user's personal computing device's 10 to have an integrated camera 13*a*, GPS 13*b*, accelerometer 13*c*, and gyroscope 13*d*.

The software application's 20 crowdfunding component 26 provides each user with a deposit account, accessible within the software application 20, which can be linked to one or more personal financial accounts provided by one or more financial institutions 40. Money which a user deposits into their deposit account can be utilized as a monetary contribution to express support for one or more economic propositions. A user may elect to make a monetary contribution by transferring money within the user's deposit account into an economic proposition's crowdfunding escrow account if the crowdfunding component 26 has enabled the economic proposition's crowdfunding escrow account. The software application 20 utilizes the crowdfunding component 26 for enabling, executing, and tracking such monetary contributions. A user may elect to make a monetary contribution for any economic proposition which satisfies the predetermined criterion provided and controlled by the crowdfunding component 26. The predetermined criterion includes a distribution protocol be established for distributing monetary contributions for an economic proposition before allowing an economic proposition to collect contributions. It is also anticipated that the monetary contribution for an economic proposition may be further earmarked for being used to support a specific cost associated with implementing the economic proposition. If the economic proposition is not implemented, the crowdfunding component 26 will automatically transfer the value of the monetary contribution back to the user's respective deposit account. Furthermore, the software application 20 may further allow contributing users to retract a monetary contribution prior to the economic proposition being approved for implementation.

It is further anticipated that the crowdfunding component 26 may allow for users to set an expiration for each of their monetary contributions to further incentivize implementation of the one or more economic propositions 3. The expiration of a monetary contribution would require the economic proposition be approved for implementation on or before a certain date specified by the user providing the monetary contribution. If a monetary contribution expires, the crowdfunding component 26 will automatically transfer the value of the monetary contribution from the economic proposition's crowdfunding escrow account back to the user's respective deposit account.

The software application 20 uses the property valuation component 27 to develop property valuations for property associated with the one or more economic propositions. The property valuation component 27 uses publicly available third-party property valuations and zoning information in combination with a plurality of statistics to determine and forecast property valuations. The plurality of statistics is aggregated from personal user data and user metadata associated with one or more economic propositions. The plurality of statistics aggregated from the one or more economic propositions is used by the property valuation component 27 to determine property valuations directly or indirectly associated with one or more economic propositions. The property valuations are determined by the property valuation component 27 by first identifying a baseline valuation using publicly available third-party property valuations for a particular parcel or lot where the economic proposition is proposed to be located. The property valuation component 27 also takes into consideration within its property valuation whether the geographic location is currently properly zoned for the economic proposition, if applicable. Subsequently, the property valuation component 27 determines a weighted value factor using the plurality of statistics aggregated from the one or more economic propositions. The property valuation component 27 applies the weighted value factor to the baseline property valuations for estimating as well as forecasting property values if one or more economic propositions are implemented.

Figure 2:
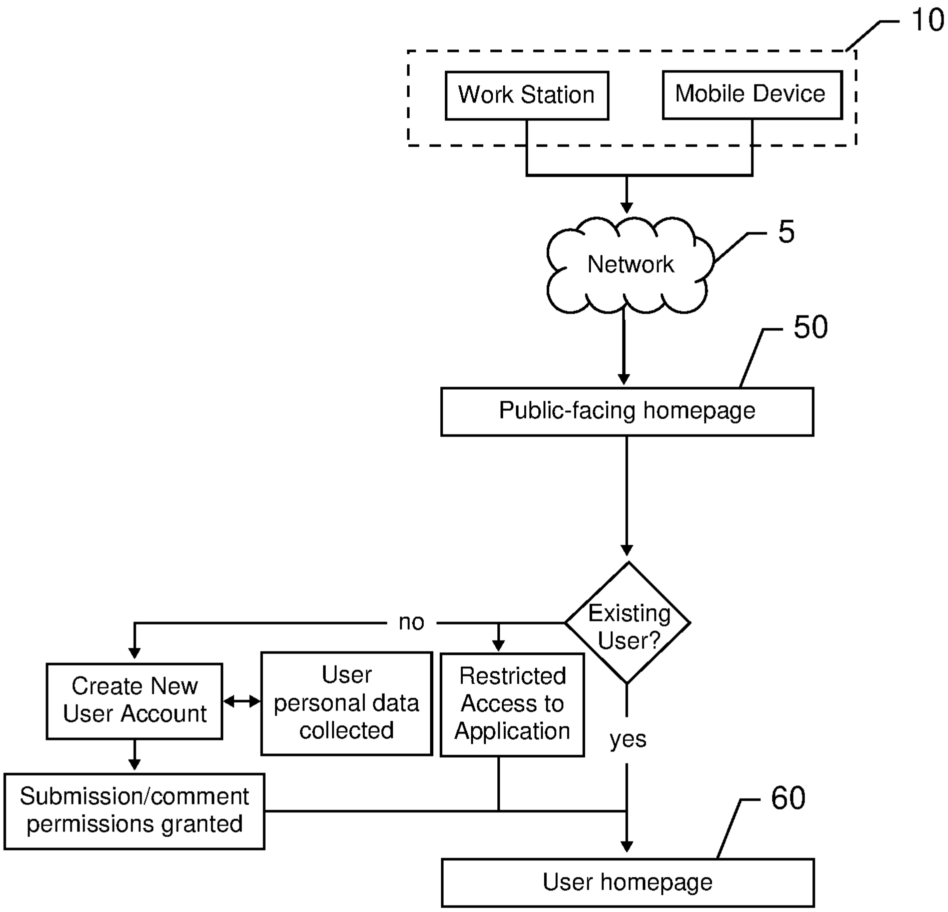
FIG. 2 depicts a schematic diagram that shows how the economic development and collaboration system may be accessed.
Figure 3:
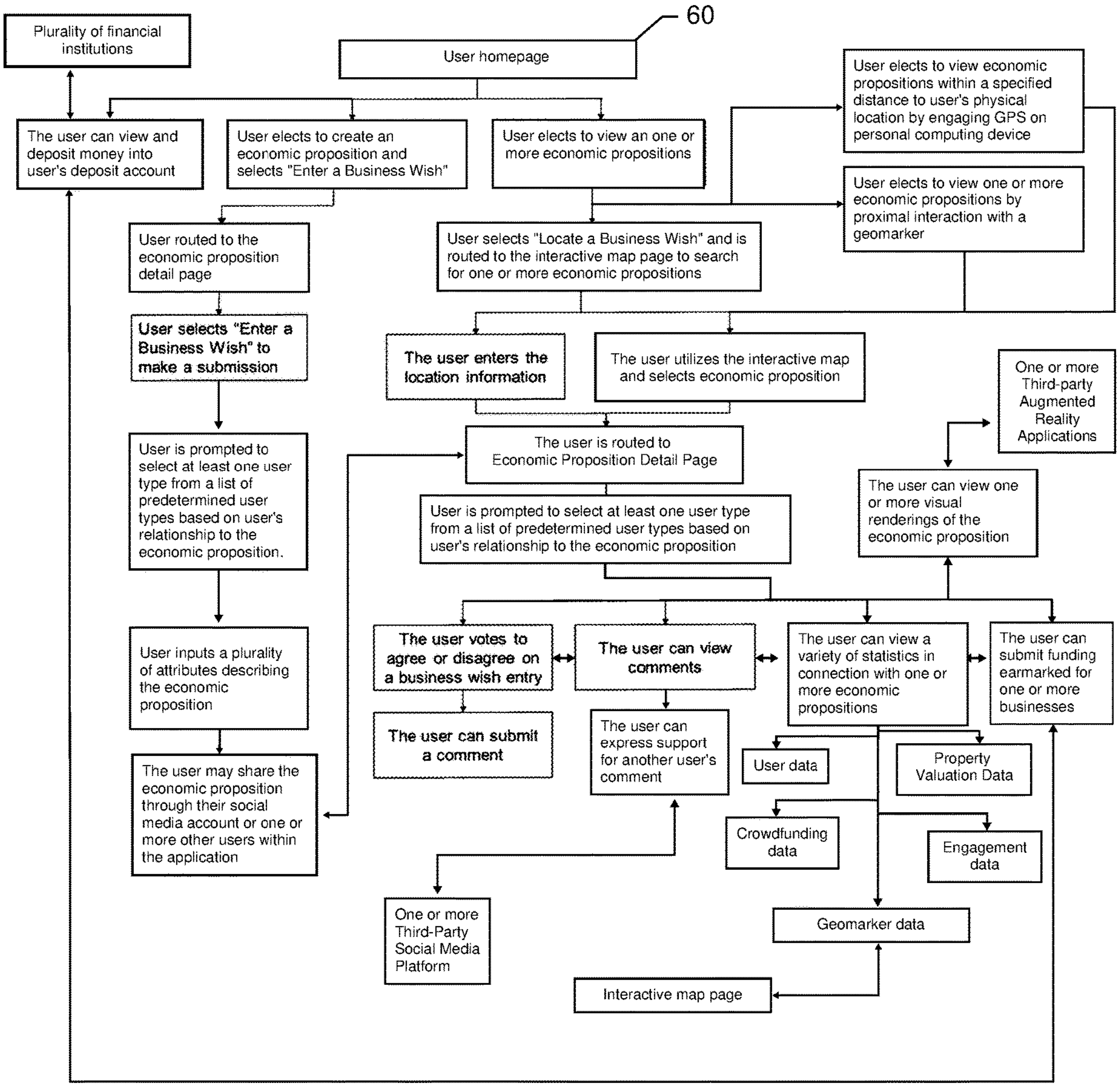
FIG. 3 depicts a schematic diagram that shows how a user of the economic development and collaboration system may access information relating to one or more economic propositions as well as engage and interact with other users of the economic development and collaboration system.
Figure 4:
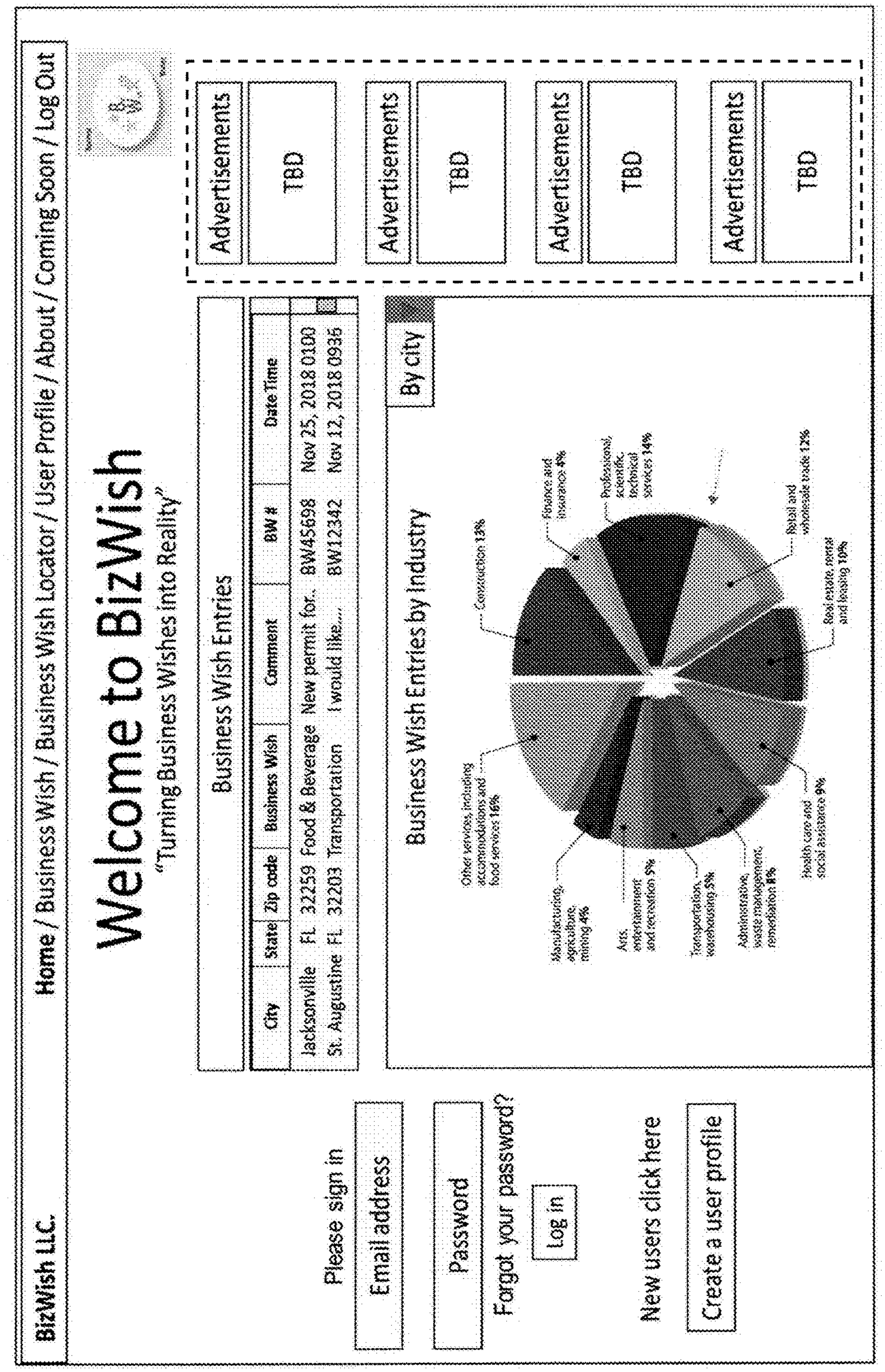
FIG. 4 is an exemplary embodiment of a public-facing homepage of a web application for an economic development and collaboration system depicting statistical data of economic propositions and advertisements.

FIG. 4 illustrates an exemplary public-facing homepage 50 which allows for limited review of statistical data without signing into a user account. As shown in FIG. 2, existing users can sign into their accounts using their username and password. New users will need to create a user account to fully access the statistical data associated with the EDC System 1 as well as engage the software application 20 and interact with other users.

Figure 5:
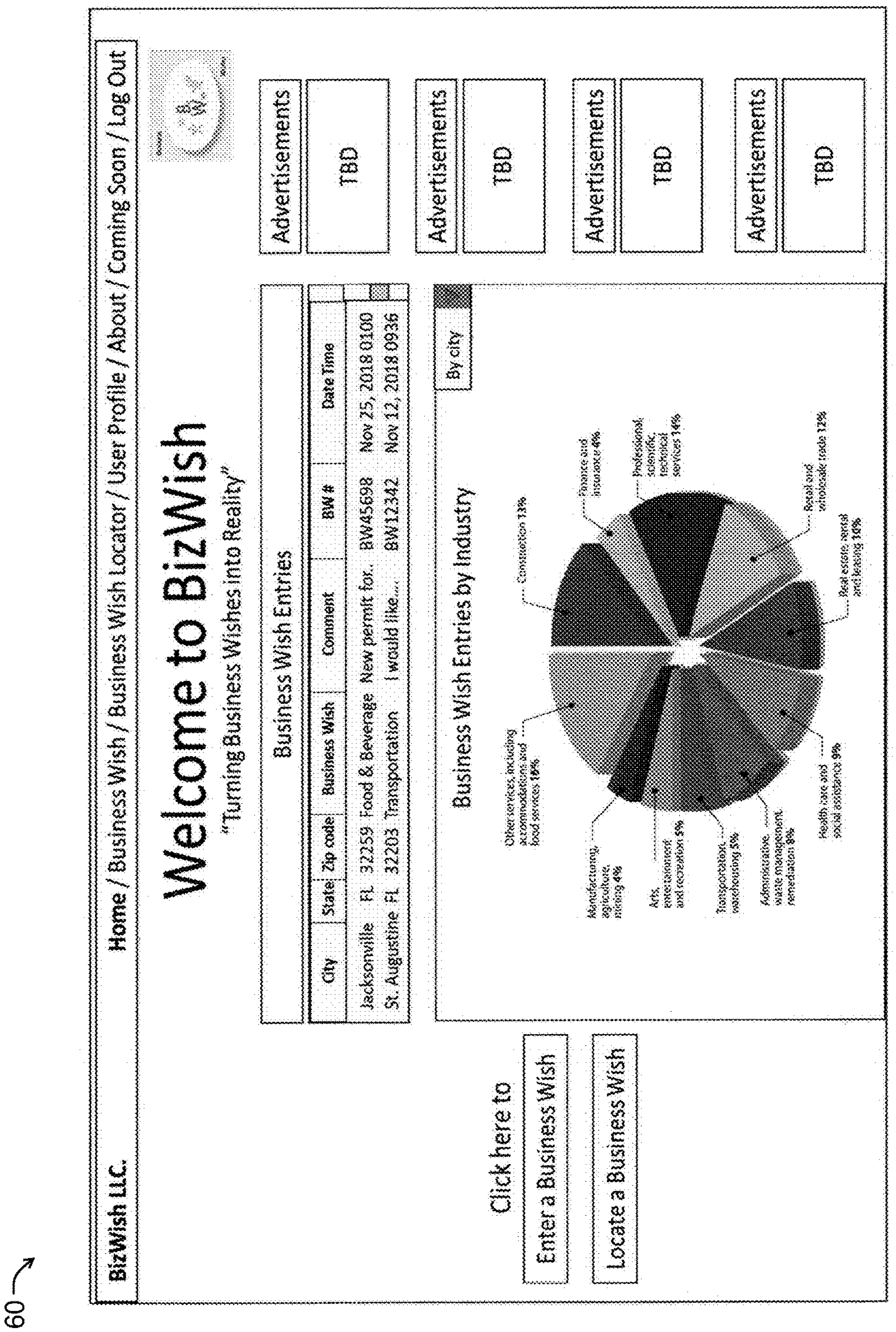
FIG. 5 is an exemplary embodiment of a user homepage of the web application for the economic development and collaboration system depicting various statistical data of economic propositions, advertisements, and access and utilize a plurality of engagement mechanisms provided by the economic development system.

FIG. 5 illustrates an exemplary user homepage 60 with new options for further access to statistical data provided by the EDC System 1. From the user homepage 60 a user can create a new economic proposition or locate an existing economic proposition. Cumulative statistical data pertaining to the economic propositions within the EDC System 1 is provided on the user homepage 60.

Figure 6:
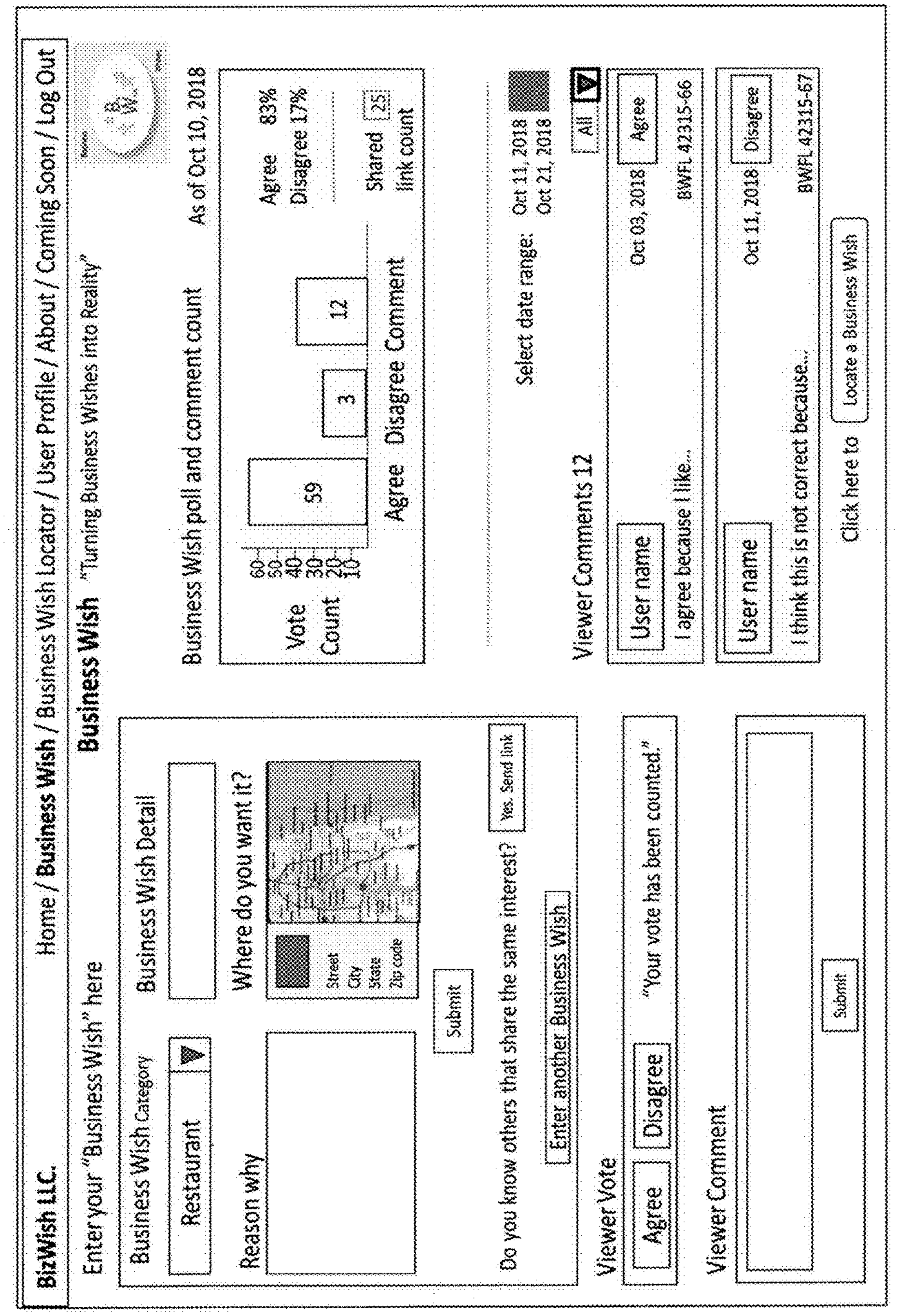
FIG. 6 is an exemplary embodiment of an economic proposition profile page of the web application for the economic development and collaboration system depicting a collaboration environment where users can submit and/or review economic propositions using the plurality of engagement mechanisms to express their support or disapproval of one or more economic propositions.

FIG. 6 illustrates an exemplary economic proposition detail page 70 specific to a particular economic proposition. The communication component 21 allows users to directly send a link to the economic proposition detail page 70 from the economic proposition detail page 70 to any email address. Similarly, it is anticipated that the communication component 21 allows for the software application 20 to integrate with one or more third-party social media platforms 35 and thereby allow users to also share a link or other information about the economic proposition on one or more third-party social media platforms 35. Such cross-platform promotion of an economic proposition is anticipated to be directly accessible from the economic proposition detail page 70. Users can view the related economic proposition statistics, provided by the analyzing component 24, on the economic proposition detail page 70 as well. Users can quickly assess the status of the corresponding economic proposition by viewing cumulative statistics of all economic propositions or a filtered subset thereof.

Figure 7:
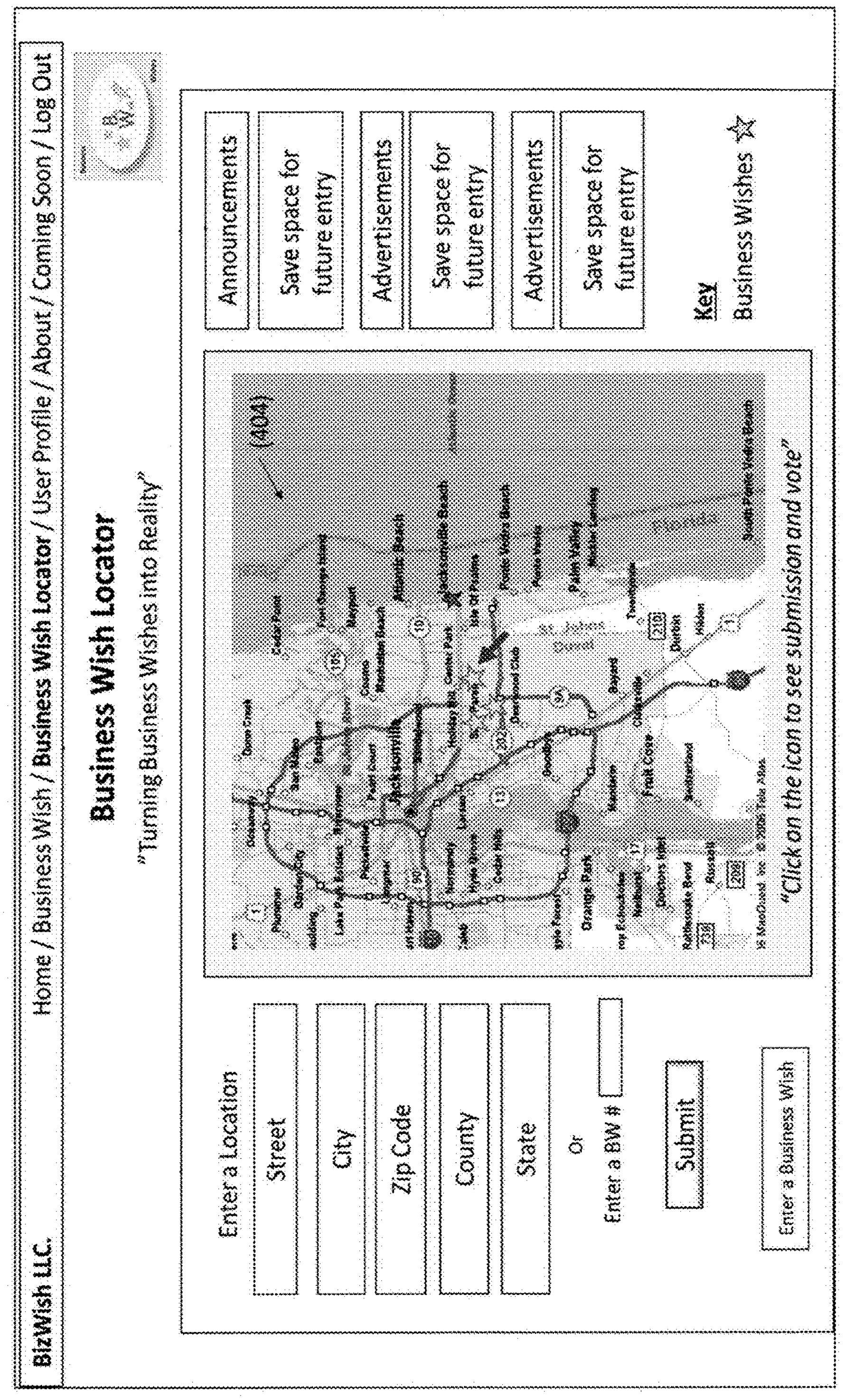
FIG. 7 is an exemplary embodiment of an economic proposition locator page of the web application for the economic development and collaboration system depicting locations of economic propositions on an interactive map.

FIG. 7 illustrates an exemplary economic proposition locator page 80. This page allows users to view existing economic propositions on the interactive map, provided by the mapping component 25. The interactive map identifies any economic propositions within its boundaries. Users can enter a specific location information such as, but not limited to; street, city, zip code, county, state, or geocoordinates to perform a text-based search for an economic proposition. Alternatively, each economic proposition is further indexed with a BW #, which may be used as an additional indexing reference and assist the software application 20 in quickly queries the database 31 for a specific economic proposition.

FIG. 8 illustrates an exemplary user account page 90. Users will be able to create economic propositions upon successful creation of a user account. It is anticipated that the EDC System 1 will require the user to routinely update and confirm the accuracy of their respective personal user data collected during the creation of their initial user account. The analyzing component 24 uses each user's personal user data, in additional with other data, to improve one or more statistics of the plurality of statistics it creates.

While the embodiments of the invention have been disclosed, certain modifications may be made by those skilled in the art to modify the invention without departing from the spirit of the invention.

What is claimed:

1. An economic development and collaboration system comprising:

a. A network;
   wherein the network has a plurality of end nodes which are wirelessly connected to it;
b. one or more personal computing devices;
   wherein the one or more personal computing devices are each further comprised of a global positioning system and a camera;
   wherein the one or more personal computing devices are connected to the network;
c. one or more servers;
   wherein the one or more servers are connected to the network;
d. a database;
   wherein the database is stored on the one or more servers;
   wherein the database stores a plurality of attributes relating to one or more economic propositions;
e. a software application;
   wherein the software application is downloadable on the one or more personal computing devices;
   wherein the software application is connected to the network and synced to the database;
   wherein the software application provides at least one user account for each user of a plurality of users;
   wherein each user account comprises disclosed personal data of a user;
   wherein the software application updates the database in real-time;
   wherein one or more economic proposals are submitted through the software application for viewing by one or more other users;
   wherein the software component further comprises:
      a mapping component;
         the mapping component providing an interactive map;
         the mapping component generating one or more geolocation icons on the interactive map;
         each geolocation icon indicating the geographical location of each economic proposal;
         the mapping component connecting to the global positioning system of the one or more personal computing devices;
      an analyzing component;
         the analyzing component providing a plurality of statistics about the one or more economic propositions;
         the analyzing component generating a notification for each economic proposition with the same geographical location;
      a communication component;
         the communication component allowing the plurality of users to communicate with one or more other users;
         wherein the plurality of users submit one or more public forms of expression pertaining to one or more economic proposals;
         the communication component providing at least one comment thread;
      a voting component;
         the voting component counts votes being submitted by the plurality of users;
      a property valuation component;
         the property valuation component providing a property value estimation for each property associated with the one or more economic proposals with a property valuation estimate.

2. The economic development and collaboration system as described in claim 1 further comprises one or more geomarkers;

a. wherein the one or more geomarkers are located at the geographic location of one or more economic propositions.

3. The economic development and collaboration system as described in claim 2 wherein each of the one or more geomarkers provides an identification code.

4. The economic development and collaboration system as described in claim 2 wherein the one or more geomarkers further provide augmented reality markers for viewing one or more augmented reality renderings.

5. The economic development and collaboration system as described in claim 1 wherein the software application further comprises a visual rendering component and a crowdfunding component.

6. The economic development and collaboration system as described in claim 5 wherein the visual rending component integrates with third-party augmented reality software applications.

7. The economic development and collaboration system as described in claim 5 wherein the crowdfunding component integrates with one or more third-party financial institutions.

8. The economic development and collaboration system as described in claim 1 wherein the one or more personal computing devices comprise a portable workstation or mobile device.

9. The economic development and collaboration system as described in claim 1 wherein the one or more economic propositions comprise either a new business, a modification to an existing business, a modification to an existing building, or an infrastructure improvement project.

10. The economic development and collaboration system as described in claim 1 wherein the interactive map may display one or more geolocation icons representing one or more economic propositions.

11. The economic development and collaboration system as described in claim 1 wherein the communication component integrates with one or more third-party social media platforms.

12. An economic development and collaboration system comprising:

a. A network;
   wherein the network has a plurality of end nodes which are wirelessly connected to it;
b. one or more personal computing devices;
   wherein the one or more personal computing devices are each further comprised of a global positioning system and a camera;
   wherein the one or more personal computing devices are connected to the network;
c. one or more servers;
   wherein the one or more servers are connected to the network;
d. a database;
   wherein the database is stored on the one or more servers;
   wherein the database stores a plurality of attributes relating to one or more economic propositions;
e. a software application;
   wherein the software application is downloadable on the one or more personal computing devices;

wherein the software application is connected to the network and synced to the database;

wherein the software application provides at least one user account for each user of a plurality of users;

wherein each user account comprises disclosed personal data of a user;

wherein the software application updates the database in real-time;

wherein one or more economic proposals are submitted through the software application for viewing by one or more other users;

wherein the software component further comprises:

a mapping component;

the mapping component providing an interactive map;

the mapping component generating one or more geolocation icons on the interactive map;

each geolocation icon indicating the geographical location of each economic proposal;

the mapping component connecting to the global positioning system of the one or more personal computing devices;

an analyzing component;

the analyzing component providing a plurality of statistics about the one or more economic propositions;

the analyzing component generating a notification for each economic proposition with the same geographical location;

a communication component;

the communication component allowing the plurality of users to communicate with one or more other users;

wherein the plurality of users submit one or more public forms of expression pertaining to one or more economic proposals;

the communication component providing at least one comment thread;

the communication component integrates with one or more third-party social media platforms a voting component;

the voting component counts votes being submitted by the plurality of users;

a property valuation component;

the property valuation component providing a property value estimation for each property associated with the one or more economic proposals with a property valuation estimate;

f. one or more geomarkers;

wherein the one or more geomarkers are located at the geographic location of one or more economic propositions.

13. The economic development and collaboration system as described in claim 12 wherein the software application further comprises a visual rendering component and a crowdfunding component.

14. The economic development and collaboration system as described in claim 13 wherein the visual rending component integrates with third-party augmented reality software applications.

15. The economic development and collaboration system as described in claim 13 wherein the crowdfunding component integrates with one or more third-party financial institutions.

16. The economic development and collaboration system as described in claim 12 wherein the one or more geomarkers further provide augmented reality markers for viewing one or more augmented reality renderings.

17. The economic development and collaboration system as described in claim 12 wherein the one or more personal computing devices comprise a portable workstation or mobile device.

18. The economic development and collaboration system as described in claim 12 wherein the one or more economic propositions comprise either a new business, a modification to an existing business, a modification to an existing building, or an infrastructure improvement project.

19. The economic development and collaboration system as described in claim 12 wherein the interactive map may display one or more geolocation icons representing one or more economic propositions.

20. The economic development and collaboration system as described in claim 12 wherein each of the one or more geomarkers provides an identification code.

* * * * *